(12) United States Patent
Wang et al.

(10) Patent No.: US 8,792,889 B2
(45) Date of Patent: Jul. 29, 2014

(54) METHOD AND APPARATUS FOR PERFORMING INTER-FREQUENCY HANDOFF IN A WIRELESS COMMUNICATION NETWORK

(75) Inventors: Jun Wang, San Diego, CA (US); Marie-Pierre Michele Daniele Aldinger, Fallbrook, CA (US); Ashrafur Reza, San Diego, CA (US); Mahmudur Rahman, Chula vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 717 days.

(21) Appl. No.: 11/866,254

(22) Filed: Oct. 2, 2007

(65) Prior Publication Data

US 2009/0088158 A1   Apr. 2, 2009

(51) Int. Cl.
*H04W 4/00* (2009.01)
*H04W 36/00* (2009.01)
*H04W 76/02* (2009.01)
*H04W 36/06* (2009.01)

(52) U.S. Cl.
CPC .......... *H04W 36/0072* (2013.01); *H04W 36/06* (2013.01); *H04W 76/028* (2013.01)
USPC .......................................... 455/436; 370/331

(58) Field of Classification Search
CPC .......... H04W 76/028; H04W 36/0072; H04W 36/14; H04W 28/04; H04W 28/08; H04W 36/06; H04W 36/22; H04W 40/246; H04W 48/16; H04W 4/06; H04W 4/12; H04W 88/06
USPC ........... 455/436–444; 370/331, 338, 328, 332
See application file for complete search history.

(56) References Cited

U.S. PATENT DOCUMENTS 5,230,081 A   7/1993   Yamada et al.
5,428,818 A * 6/1995   Meidan et al. ................. 455/436

(Continued)

FOREIGN PATENT DOCUMENTS

EP   1145569 A2   10/2001
EP   1608197      12/2005

(Continued)

OTHER PUBLICATIONS

3GPP2 C.S0024, "cdma2000 High Rate Packet Data Air Interface Specification", Sep. 12, 2000, pp. 6-73-6-77, XP002511770 paragraph 6.8.6.2.

(Continued)

*Primary Examiner* — Nizar Sivji
(74) *Attorney, Agent, or Firm* — Howard Seo

(57) ABSTRACT

Techniques for performing inter-frequency handoff in a wireless communication network are described. An access terminal may acquire a first sector on a first frequency (e.g., at power up), receive an overhead message from the first sector, obtain neighbor list information from the overhead message, and store this information. The access terminal may be directed from the first frequency to a second frequency, e.g., to balance network load. The access terminal may perform handoff to a second sector on the second frequency. This handoff may be unsuccessful if the access terminal is within the coverage of the first sector but outside the coverage of the second sector, even though the two sectors may be co-located. If the handoff is unsuccessful, then the access terminal may determine a neighbor sector based on the stored neighbor list information, then attempt acquisition of the neighbor sector, and perform handoff to the neighbor sector if acquired.

37 Claims, 7 Drawing Sheets

(56) References Cited

U.S. PATENT DOCUMENTS

| | | | |
|---|---|---|---|
| 5,675,629 A * | 10/1997 | Raffel et al. | 455/552.1 |
| 5,839,070 A * | 11/1998 | Lupien et al. | 455/440 |
| 5,839,071 A * | 11/1998 | Johnson | 455/440 |
| 6,131,030 A | 10/2000 | Schon et al. | |
| 6,167,036 A * | 12/2000 | Beven | 370/331 |
| 6,269,087 B1 | 7/2001 | Nakamura et al. | |
| 6,597,911 B1 * | 7/2003 | Kransmo | 455/436 |
| 8,514,778 B1 * | 8/2013 | Fang et al. | 370/328 |
| 2003/0100306 A1 | 5/2003 | Shinoda | |
| 2006/0063531 A1 * | 3/2006 | Jung et al. | 455/442 |
| 2006/0084443 A1 * | 4/2006 | Yeo et al. | 455/449 |
| 2006/0233138 A1 | 10/2006 | Park | |
| 2006/0274695 A1 * | 12/2006 | Krishnamurthi et al. | 370/331 |
| 2007/0054667 A1 * | 3/2007 | Lee et al. | 455/434 |
| 2007/0089296 A1 | 4/2007 | Tatehira et al. | |
| 2007/0097939 A1 * | 5/2007 | Nylander et al. | 370/338 |
| 2007/0149196 A1 * | 6/2007 | Choi et al. | 455/436 |
| 2007/0201439 A1 | 8/2007 | Sun et al. | |
| 2009/0274301 A1 * | 11/2009 | Otte et al. | 380/270 |
| 2010/0309868 A1 * | 12/2010 | Yang et al. | 370/329 |

FOREIGN PATENT DOCUMENTS

| | | |
|---|---|---|
| JP | 3104430 A | 5/1991 |
| JP | 10013907 | 1/1998 |
| JP | 10028282 A | 1/1998 |
| JP | 2003502880 A | 1/2003 |
| JP | 2003169360 A | 6/2003 |
| JP | 2005524366 A | 8/2005 |
| KR | 20000001856 A | 1/2000 |
| KR | 20060110384 A | 10/2006 |
| KR | 20070071317 A | 7/2007 |
| RU | 2249917 C2 | 4/2005 |
| WO | WO9967972 | 12/1999 |
| WO | WO0011878 A2 | 3/2000 |
| WO | WO03094568 | 11/2003 |
| WO | WO 2007089296 A2 * | 8/2007 |

OTHER PUBLICATIONS

3GPP2 C.S0024 v. 3.0: CDMA2000 High Rate Packet Data Air Interface Specification (Dec. 2001).

European Search Report—EP08153837—Search Authority—Munich—Jan. 23, 2009.

European Search Report—EP10171775—Search Authority—Munich—Sep. 13, 2010.

International Search Report and Written Opinion—PCT/US2008/078364, International Search Authority—European Patent Office—Feb. 9, 2009.

Taiwan Search Report—TW097137977—TIPO—Feb. 17, 2012.

* cited by examiner

SectorParameters Message

| | | Field | Length (bits) |
|---|---|---|---|
| Frequency Information | | ⋮ | ⋮ |
| | | ChannelCount (M) | 5 |
| | 1 | Channel | 24 |
| | ⋮ | ⋮ | ⋮ |
| | M | Channel | 24 |
| Neighbor List Information | | NeighborCount (N) | 5 |
| | 1 | NeighborPilotPN | 9 |
| | ⋮ | ⋮ | ⋮ |
| | N | NeighborPilotPN | 9 |
| | 1 | NeighborChannelIncluded | 1 |
| | 1 | NeighborChannel | 0 or 24 |
| | ⋮ | ⋮ | ⋮ |
| | N | NeighborChannelIncluded | 1 |
| | N | NeighborChannel | 0 or 24 |
| | | ⋮ | ⋮ |

*FIG. 4*

METHOD AND APPARATUS FOR PERFORMING INTER-FREQUENCY HANDOFF IN A WIRELESS COMMUNICATION NETWORK

BACKGROUND

I. Field

The present disclosure relates generally to communication, and more specifically to techniques for performing handoff in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may operate on multiple frequency channels in order to improve capacity. A frequency channel may also be referred to as a radio frequency (RF) channel, a CDMA channel, a carrier, etc. The wireless network may distribute access terminals (e.g., cellular phones) among the multiple frequency channels such that the network load can be evenly distributed across the frequency channels. This may result in many access terminals being handed off from one frequency channel to another frequency channel. It is desirable to perform handoff to another frequency channel, if necessary, in an expedient manner.

SUMMARY

Techniques for performing inter-frequency handoff in a wireless communication network are described herein. An access terminal may acquire a first sector on a first frequency in the wireless network (e.g., at power up) and may receive an overhead message from the first sector. The access terminal may obtain neighbor list information from the overhead message and store this information. The access terminal may be directed from the first frequency to a second frequency, e.g., to balance network load. The access terminal may then perform handoff to a second sector on the second frequency. The first and second sectors may have different coverage areas even though they may be co-located and served by the same access point. The handoff to the second sector may be unsuccessful if the access terminal is within the coverage of the first sector but outside the coverage of the second sector.

If the handoff to the second sector is unsuccessful, then the access terminal may determine a neighbor sector based on the stored neighbor list information. For example, a list of neighbor sectors on the second frequency may be determined based on the neighbor list information, and the neighbor sector may be selected from this list. The access terminal may then attempt acquisition of the neighbor sector and may perform handoff to the neighbor sector if acquired. The access terminal may thus avoid declaring system loss when the handoff to the second sector is unsuccessful and an overhead message cannot be received from the second sector to obtain neighbor list information.

The techniques described herein may be used for inter-system handoff at power up and also for inter-frequency handoff while operating in an idle mode or an active mode. Various aspects and features of the disclosure are described in further detail below.

BRIEF DESCRIPTION OF THE DRAWINGS

FIG. 4 shows the format of a SectorParameters message.

DETAILED DESCRIPTION

The techniques described herein may be used for various wireless communication networks such as CDMA, TDMA, FDMA, OFDMA and SC-FDMA networks. The terms "network" and "system" are often used interchangeably. A CDMA network may implement a radio technology such as cdma2000, Universal Terrestrial Radio Access (UTRA), etc. cdma2000 covers IS-2000, IS-95, and IS-856 standards. UTRA includes Wideband-CDMA (W-CDMA), Low Chip Rate (LCR), etc. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. These various radio technologies and standards are known in the art. UTRA, E-UTRA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the techniques are described for a High Rate Packet Data (HRPD) network that implements IS-856. HRPD is also referred to as CDMA2000 1xEV-DO (Evolution-Data Optimized), 1xEV-DO, 1x-DO, DO, High Data Rate (HDR), etc. The terms "HRPD", "EV-DO", and "DO" are often used interchangeably. HRPD is described in 3GPP2 C.S0024-B, entitled "cdma2000 High Rate Packet Data Air Interface Specification," dated March 2007, which is publicly available. For clarity, HRPD terminology is used in much of the description below.

Figure 1:
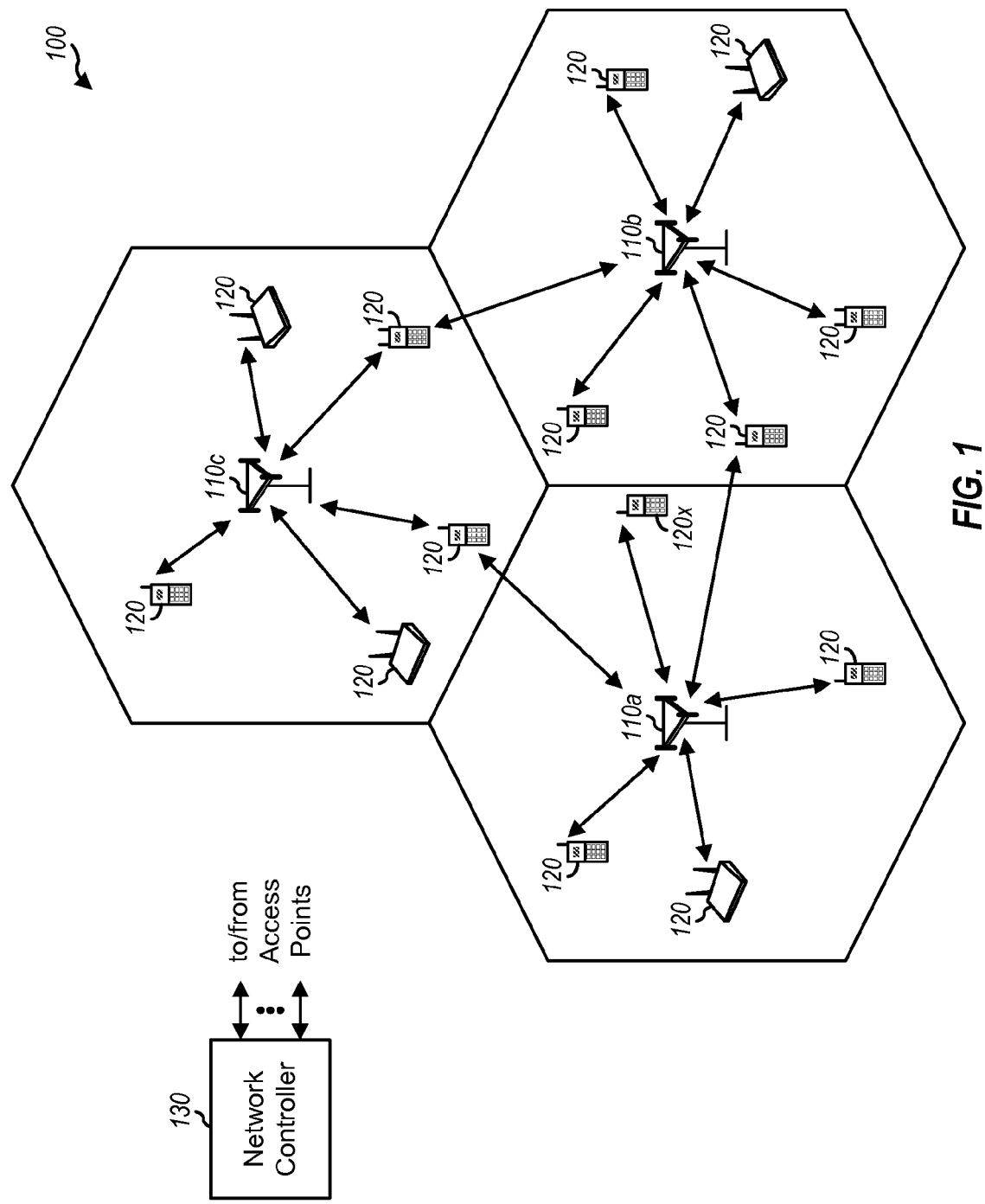
FIG. 1 shows a wireless communication network.

FIG. 1 shows a wireless communication network 100, which may be an HRPD network. Wireless network 100 may include any number of access points 110 that can support communication for any number of access terminals 120. An access point is generally a fixed station that communicates with the access terminals and may also be referred to as a base station, a Node B, an evolved Node B (eNode B), etc. Each access point 110 provides communication coverage for a particular geographic area. The term "cell" can refer to an access point and/or its coverage area, depending on the context in which the term is used. To improve network capacity, an access point coverage area may be partitioned into multiple smaller areas, e.g., three smaller areas. The term "sector" can refer to the smallest unit of coverage or a fixed station serving this coverage area, depending on the context in which the term is used. For a sectorized cell, an access point typically serves all sectors of the cell. In general, the techniques described herein may be used for wireless networks with sectorized cells as well as wireless networks with un-sectorized cells. The following description assumes a wireless network with sectorized cells.

Access terminals 120 may be dispersed throughout wireless network 100, and each access terminal may be stationary or mobile. An access terminal may also be referred to as a mobile station, a user equipment, a terminal, a subscriber unit, a station, etc. An access terminal may be a cellular phone, a personal digital assistant (PDA), a wireless device, a handheld device, a wireless modem, a laptop computer, etc. In HRPD, an access terminal may receive a transmission on the forward link from one access point at any given moment and may send a transmission on the reverse link to one or more access points. The forward link (or downlink) refers to the communication link from the access points to the access terminals, and the reverse link (or uplink) refers to the communication link from the access terminals to the access points.

A network controller 130 may couple to access points 110 and provide coordination and control for these access points. Network controller 130 may be a single network entity or a collection of network entities. In HRPD, network controller 130 may include network entities such as a Base Station Controller (BSC), a Packet Control Function (PCF), a Packet Data Serving Node (PDSN), etc.

Wireless network 100 may operate on multiple frequency channels, which may be referred to as CDMA channels. In HRPD, each CDMA channel has a bandwidth of 1.25 MHz and may be used to send one CDMA signal. Network capacity may be improved by using multiple CDMA channels.

Figure 2:
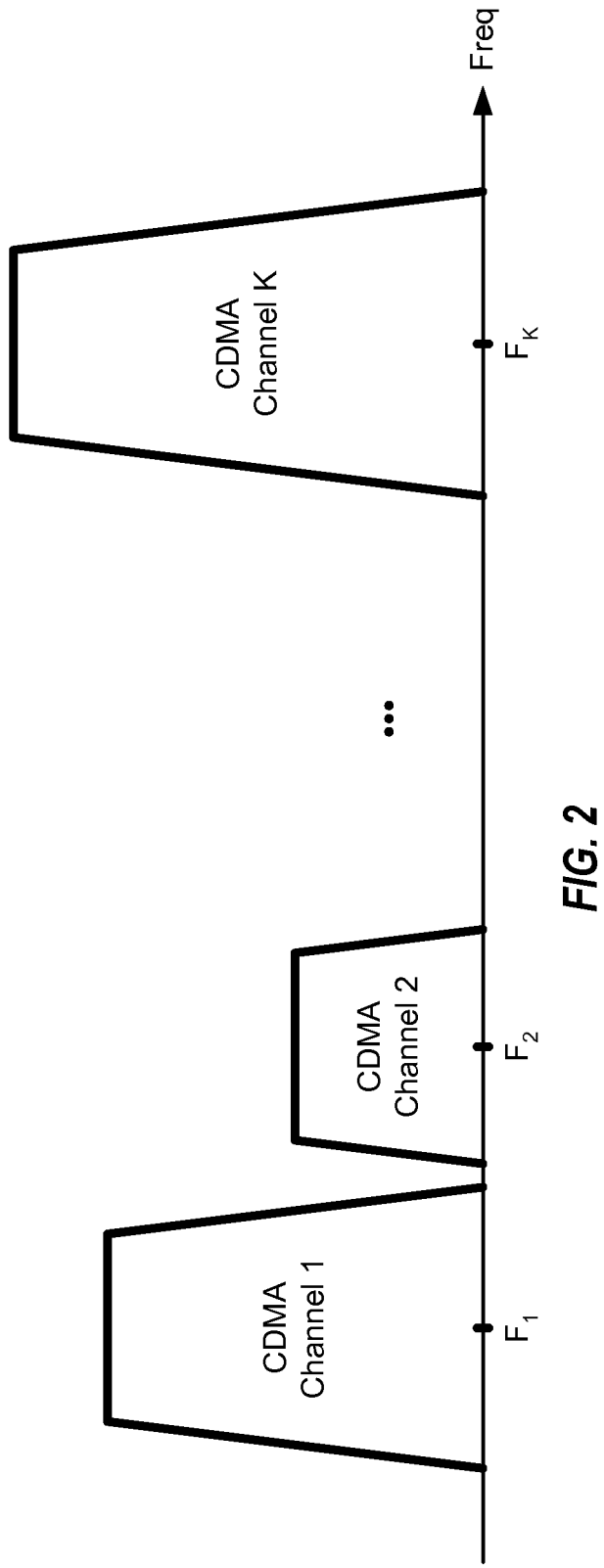
FIG. 2 shows an access point supporting multiple sectors on different frequencies in a vertical deployment.

FIG. 2 shows K CDMA signals on K CDMA channels from one access point in a vertical deployment, where K>1. In this example, CDMA channel 1 has a center frequency of $F_1$, CDMA channel 2 has a center frequency of $F_2$, and so on, and CDMA channel K has a center frequency of $F_K$. The center frequencies are selected such that the CDMA channels are spaced sufficiently far apart to reduce inter-channel interference. In general, the center frequencies of the K CDMA channels may be spaced apart by any amount, subject to the minimum spacing criterion, and may be in the same or different frequency bands. The K CDMA signals may be transmitted at the same or different power levels by the access point. These CDMA signals may also be received at the same or different power levels by an access terminal.

In HRPD, a sector may be defined by a specific pseudo-random number (PN) offset and a specific center frequency (or simply, frequency). The sector may spectrally spread its data, signaling and pilot with a PN sequence at the assigned PN offset to generate output chips. The sector may further process the output chips to generate a CDMA signal at the assigned frequency.

An access point may serve multiple (e.g., three) sectors on a given frequency. These sectors may be assigned different PN offsets and may have different coverage areas that may overlap at the edges. In a vertical deployment, the access point may operate on multiple frequencies and may serve multiple sets of sectors on different frequencies. For example, the access point may serve three sectors on each frequency, and may serve a total of six sectors on two different frequencies.

Multiple sectors may be deployed on different frequencies over a given geographic area (or co-located) in order to improve network capacity. The access terminals within this geographic area may be directed to different frequencies in order to balance the load on these sectors. Ideally, the co-located sectors should have the same coverage area so that the access terminals can receive the same coverage regardless of which sectors they communicate with. However, in a practical implementation, it may be difficult to have the same coverage area for the co-located sectors, especially if these sectors operate on frequencies in different band classes. The different coverage areas for the co-located sectors may result from different transmitter characteristics, different antenna characteristics, and/or different RF propagation characteristics at different frequencies. The unequal sector coverage areas may cause communication failures in some operating scenarios.

Figure 3:
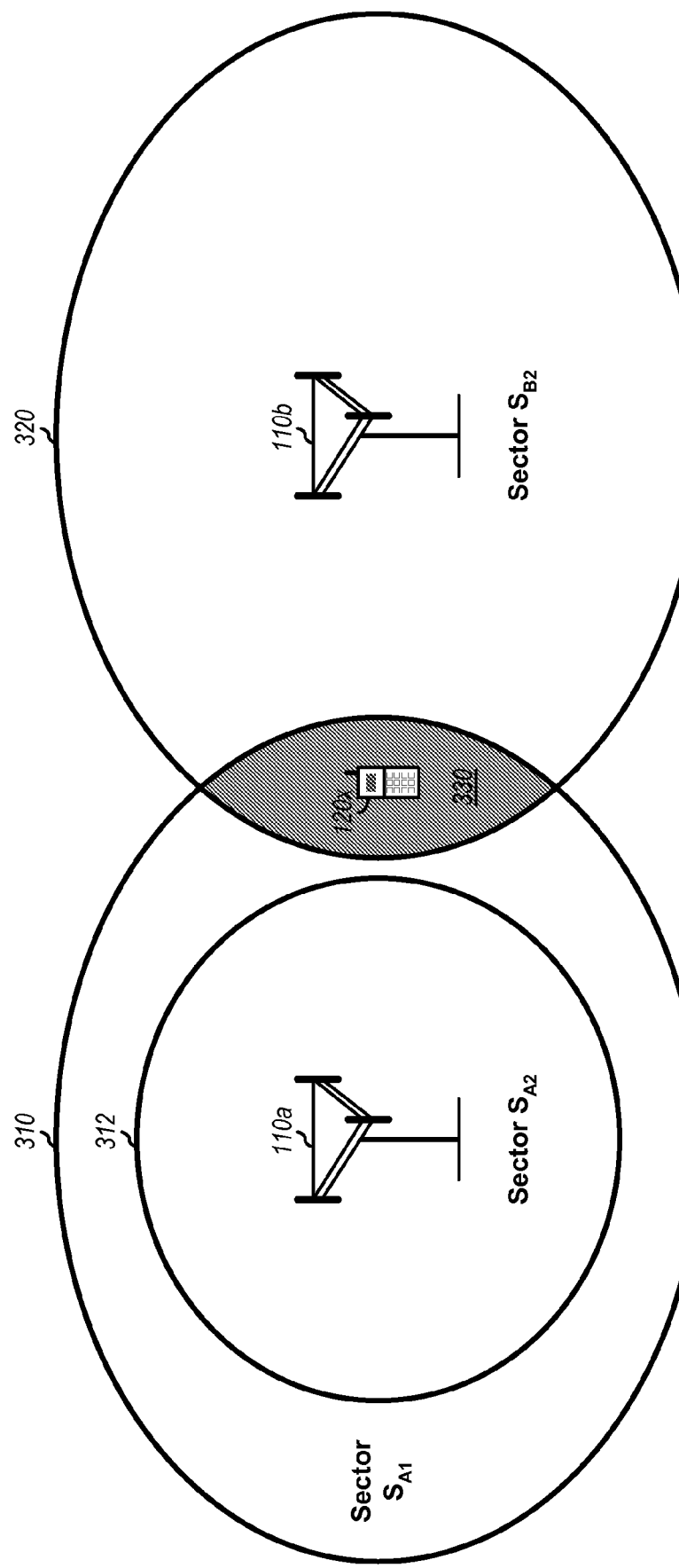
FIG. 3 shows a vertical deployment with unequal coverage areas.

FIG. 3 shows an example of vertical deployment at access point 110a with unequal sector coverage areas. In this example, sectors $S_{A1}$ and $S_{A2}$ are co-located and deployed over one geographic area, and sector $S_{B2}$ is deployed over another geographic area. Sector $S_{A1}$ has a PN offset of x, operates on frequency $F_1$, and has a coverage area 310. Sector $S_{A2}$ has a PN offset of y, operates on frequency $F_2$, and has a coverage area 312. Sector $S_{B2}$ has a PN offset of z, operates on frequency $F_2$, and has a coverage area 320. In general, x, y and z may be any PN offsets. In the example shown in FIG. 3, coverage area 312 of sector $S_{A2}$ is smaller than coverage area 310 of sector $S_{A1}$. Coverage area 320 of sector $S_{B2}$ overlaps coverage area 310 of sector $S_{A1}$ but does not overlap coverage area 312 of sector $S_{A2}$.

An access terminal 120x may be located in an area 330, which may overlap both coverage areas 310 and 320 of sectors $S_{A1}$ and $S_{B2}$, respectively. Upon power up, access terminal 120x may perform a system search based on a preferred roaming list (PRL) stored at the access terminal. The PRL may identify permitted systems/networks that access terminal 120x can access and optionally forbidden systems/networks that the access terminal cannot access. The PRL may also include pertinent parameters used to search for the permitted systems/networks, such as the PN offsets and frequencies of sectors in the permitted systems/networks.

Access terminal 120x may acquire sector $S_{A1}$ based on the PRL. Access terminal 120x may then receive overhead messages such as a SectorParameters message from sector $S_{A1}$. The SectorParameters message may contain frequency information that may indicate the number of CDMA channels available in the coverage area of sector $S_{A1}$, the frequency of each CDMA channel, etc. In the example shown in FIG. 3, the frequency information may indicate two CDMA channels at frequencies $F_1$ and $F_2$. If multiple CDMA channels are given in the SectorParameters message, then access terminal 120x may select one CDMA channel based on a hash function. Access terminal 120x may provide a SessionSeed and a ChannelCount to the hash function. The SessionSeed may be a 32-bit pseudo-random number generated for a session for access terminal 120x. The ChannelCount may be the number of CDMA channels indicated by the SectorParameters message. The hash function may provide a hash value, which may be used to select a specific CDMA channel from among the CDMA channels provided in the SectorParameters message.

Access terminal 120x may initially acquire sector $S_{A1}$ on frequency $F_1$ and may perform inter-frequency handoff to sector $S_{A2}$ if the hash function selects frequency $F_2$. Sectors $S_{A1}$ and $S_{A2}$ may have different coverage, as shown in FIG. 3, and access terminal 120x may be outside the coverage of sector $S_{A2}$ on the new frequency $F_2$. In this case, the handoff to sector $S_{A2}$ may fail. Access terminal 120x may then declare system loss and may proceed to re-acquire the wireless network. Access terminal 120x may again acquire sector $S_{A1}$ (instead of sector $S_{B2}$) based on either the PRL stored at the access terminal or a database of previously acquired sectors maintained by the access terminal. Access terminal 120x may then receive the SectorParameters message from sector $S_{A1}$ and may again be hashed to frequency $F_2$ because the same SessionSeed is used for the hash function even though access terminal 120x has gone through system loss and re-acquisition. Access terminal 120x may continue in this loop for an extended period of time until the session expires. This may result in the user experiencing loss of service and may further drain battery life, both of which are undesirable.

In an aspect, to avoid system loss and re-acquisition due to inter-frequency handoff, access terminal 120x may obtain and store neighbor list information from an acquired sector prior to performing handoff to a new sector on a new frequency. If the handoff is successful, then access terminal 120x may operate in the normal manner on the new sector. However, if the handoff is unsuccessful, then access terminal 120x may use the stored neighbor list information to search for neighbor sectors. Access terminal 120x may be able to acquire a neighbor sector and operate on this sector instead of declaring system loss. This may avoid the scenario described above in which access terminal 120x repeatedly acquires a first sector, is hashed to a second sector on another frequency, is outside the coverage of the second sector, declares system loss, re-acquires the first sector, etc.

FIG. 4 shows the format of the SectorParameters message in HRPD. The SectorParameters message may carry frequency information and/or neighbor list information. For the frequency information, a ChannelCount field indicates the number of CDMA channels (M) conveyed in the SectorParameters message, where M may be zero or greater. M Channel fields then follow in the SectorParameters message, with each Channel field containing information on the frequency (e.g., the band class and channel number) of one CDMA channel. Access terminal 120x may be hashed to one of the M CDMA channels if M>0.

For the neighbor list information, a NeighborCount field indicates the number of neighbor sectors (N) conveyed in the SectorParameters message, where N may be zero or greater. N sets of NeighborPilotPN, NeighborChannelIncluded, and NeighborChannel fields then follow in the SectorParameters message, one set for each neighbor sector. For each neighbor sector, the NeighborPilotPN field contains the PN offset of that neighbor sector. The NeighborChannelIncluded field indicates whether or not the NeighborChannel field is included. The NeighborChannel field is included if the neighbor sector operates on a different frequency than the frequency of the sector transmitting the SectorParameters message and is omitted otherwise. The NeighborChannel field (if included) contains information on the frequency of the neighbor sector.

Referring back to FIG. 3, access terminal 120x may initially acquire sector $S_{A1}$ on frequency $F_1$ and may receive the SectorParameters message from this sector. Access terminal 120x may obtain neighbor list information from the SectorParameters message received from sector $S_{A1}$. The neighbor list information may include information on neighbor sectors operating on the same frequency as sector $S_{A1}$ as well as other frequencies given in the M Channel fields. A neighbor sector operating on a different frequency than frequency $F_1$ of sector $S_{A1}$ may have its NeighborChannel field included in the SectorParameters message. In the example shown in FIG. 3, the neighbor list information for sector $S_{A1}$ may include sector $S_{B2}$. Access terminal 120x may store the neighbor list information prior to performing the hash and handoff to another sector on another frequency.

In the example shown in FIG. 3, access terminal 120x may perform handoff to sector $S_{A2}$ if the hash function selects frequency $F_2$. Access terminal 120x may be outside the coverage of sector $S_{A2}$, the handoff may fail, and access terminal 120x may not be able to receive the SectorParameters message from sector $S_{A2}$. Access terminal 120x may then retrieve the neighbor list information obtained earlier from sector $S_{A1}$ and may attempt to acquire one of the neighbor sectors. In the example shown in FIG. 3, access terminal 120x may attempt to acquire sector $S_{B2}$ on frequency $F_2$ to which access terminal 120x is hashed. Access terminal 120x may successfully acquire sector $S_{B2}$, perform handoff to this sector, and operate on the sector without declaring system loss.

Figure 5:
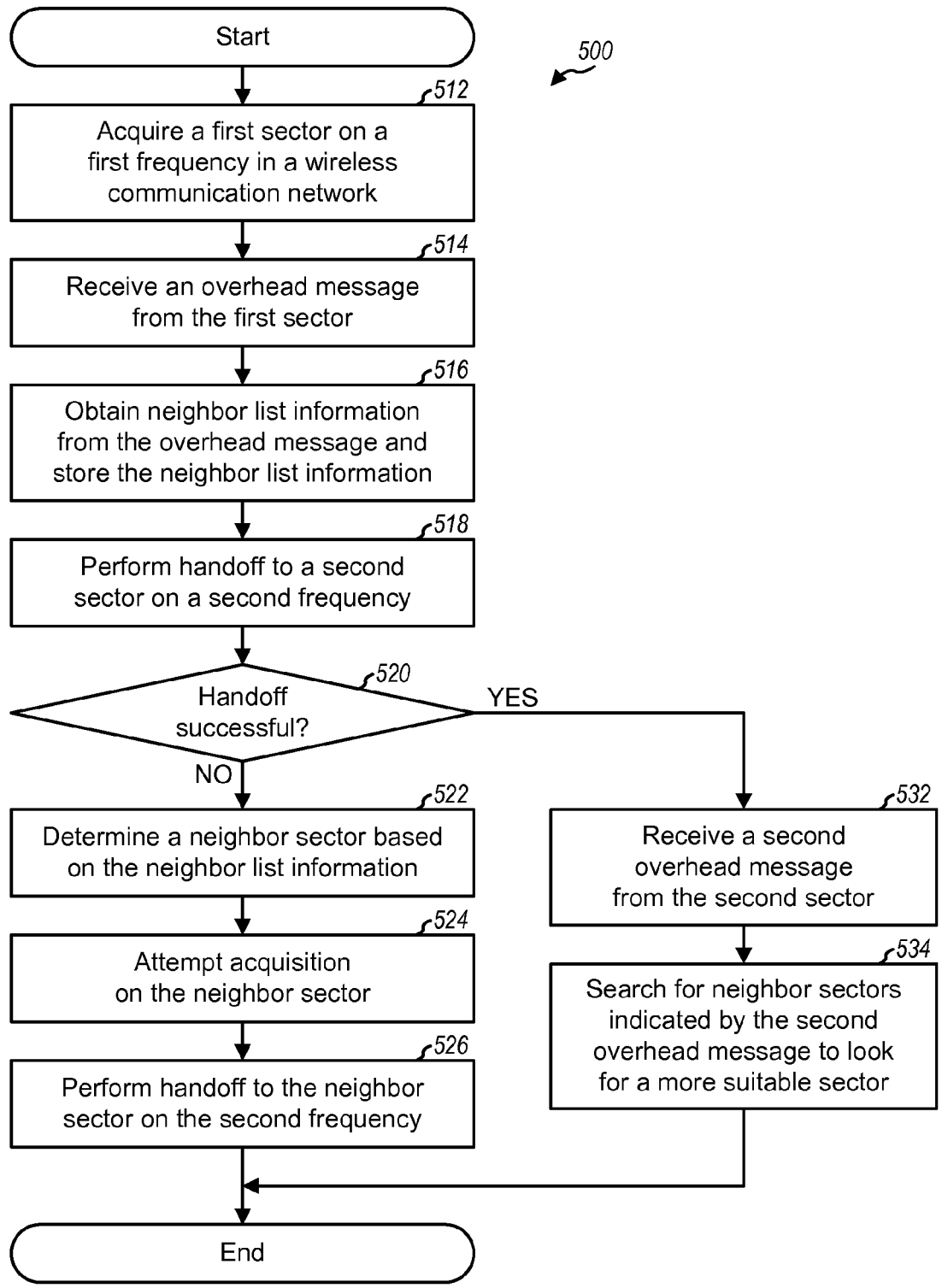
FIG. 5 shows a process to perform inter-frequency handoff.

FIG. 5 shows a design of a process 500 performed by an access terminal for inter-frequency handoff. A first sector on a first frequency in a wireless communication network may be acquired (block 512). An overhead message may be received from the first sector (block 514). The wireless network may be an HRPD network or some other wireless network, and the overhead message may be a SectorParameters message or some other message. Neighbor list information may be obtained from the overhead message and stored (block 516).

Handoff to a second sector on a second frequency may be performed (block 518). If the handoff to the second sector is unsuccessful, as determined in block 520, then a neighbor sector may be determined based on the neighbor list information (block 522). Acquisition of the neighbor sector may be attempted (block 524). If the neighbor sector is acquired, then handoff to the neighbor sector may be performed (block 526).

In one design, a list of neighbor sectors operating on the second frequency may be determined based on the neighbor list information, and the neighbor sector may be selected from this list. In this design, acquisition may be attempted on another sector on the same frequency as the failed handoff. In another design, a list of neighbor sectors operating on any or all frequencies may be determined based on the neighbor list information, and the neighbor sector may be selected from this list. In this design, acquisition may be attempted on any sector on any frequency. For example, acquisition may first be attempted on neighbor sectors on the second frequency, then on neighbor sectors on the first frequency, etc.

If the handoff to the second sector is successful, as determined in block 520, then a second overhead message may be received from the second sector (block 532). A search for neighbor sectors indicated by the second overhead message may be performed to look for a more suitable sector (block 534). Blocks 532 and 534 may be performed for normal operation.

Process 500 may be performed by the access terminal at power up. A search for sectors in the wireless network may be performed at power up. The first sector may be detected during this search and may be acquired to access the wireless network. A set of frequencies comprising the first and second frequencies may be obtained from the overhead message received from the first sector. The second frequency may be selected based on a hash function, and the handoff to the second sector on the second frequency may be performed based on the result of the hash function.

Process 500 may also be performed by the access terminal for inter-frequency handoff while operating in an idle mode or an active mode. An inter-frequency search for neighbor sectors may be performed while communicating with the first sector. The second sector may be detected by the inter-frequency search and may be better (e.g., received stronger) than the first sector. Inter-frequency handoff from the first sector to the second sector may then be performed to obtain service from the better sector.

In another aspect, a sector operating on one frequency may broadcast a neighbor list for a co-located sector operating on another frequency in order to support inter-frequency handoff by the access terminals. The neighbor list for a given sector may include neighbor sectors operating on the same frequency. In this case, a sector may broadcast its neighbor list (e.g., without using the NeighborChannel fields) as well as the neighbor list for each co-located sector (e.g., using the NeighborChannel fields). Alternatively, the neighbor list for a given sector may include neighbor sectors operating on any or all frequencies. In this case, the co-located sectors may have the same or similar neighbor lists. In any case, the neighbor list information for a first sector that access terminal 120*x* is handed off from may be similar to the neighbor list information for a second sector that the access terminal is handed off to. This may then allow access terminal 120*x* to use the neighbor list information received from the first sector as if the information is received from the second sector.

Figure 6:
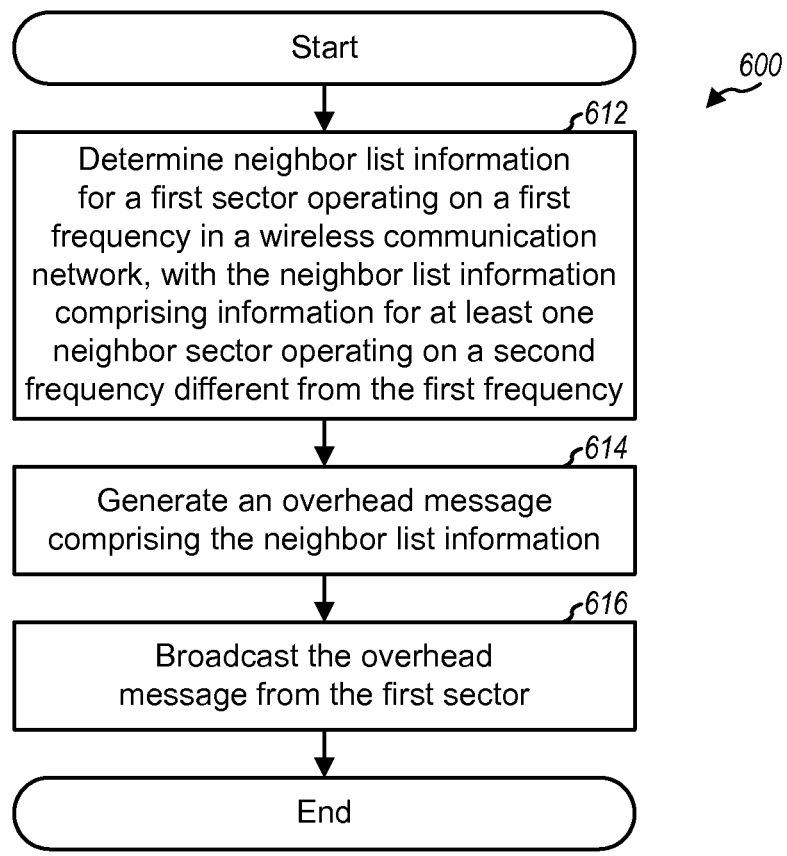
FIG. 6 shows a process to support inter-frequency handoff.

FIG. 6 shows a design of a process 600 performed by an access point to support inter-frequency handoff. Neighbor list information for a first sector operating on a first frequency in a wireless communication network (e.g., an HRPD network) may be determined (block 612). The neighbor list information may comprise information for at least one neighbor sector operating on a second frequency that is different from the first frequency. A neighbor list for a second sector operating on the second frequency and co-located with the first sector may be obtained. The at least one neighbor sector in the neighbor list information may be determined based on the neighbor list for the second sector. The neighbor list information may also comprise information for neighbor sectors on the first frequency and/or other frequencies. An overhead message (e.g., a SectorParameters message) comprising the neighbor list information may be generated (block 614). The overhead message may be broadcast from the first sector (block 616).

The techniques described herein may be beneficial to both the access terminals and the wireless network. The techniques may avoid loss of service and may improve battery life for the access terminals. The techniques may also allow for vertical deployment of sectors on different frequencies to improve network capacity, which may be especially beneficial for "hot spots" with high data usage.

Figure 7:
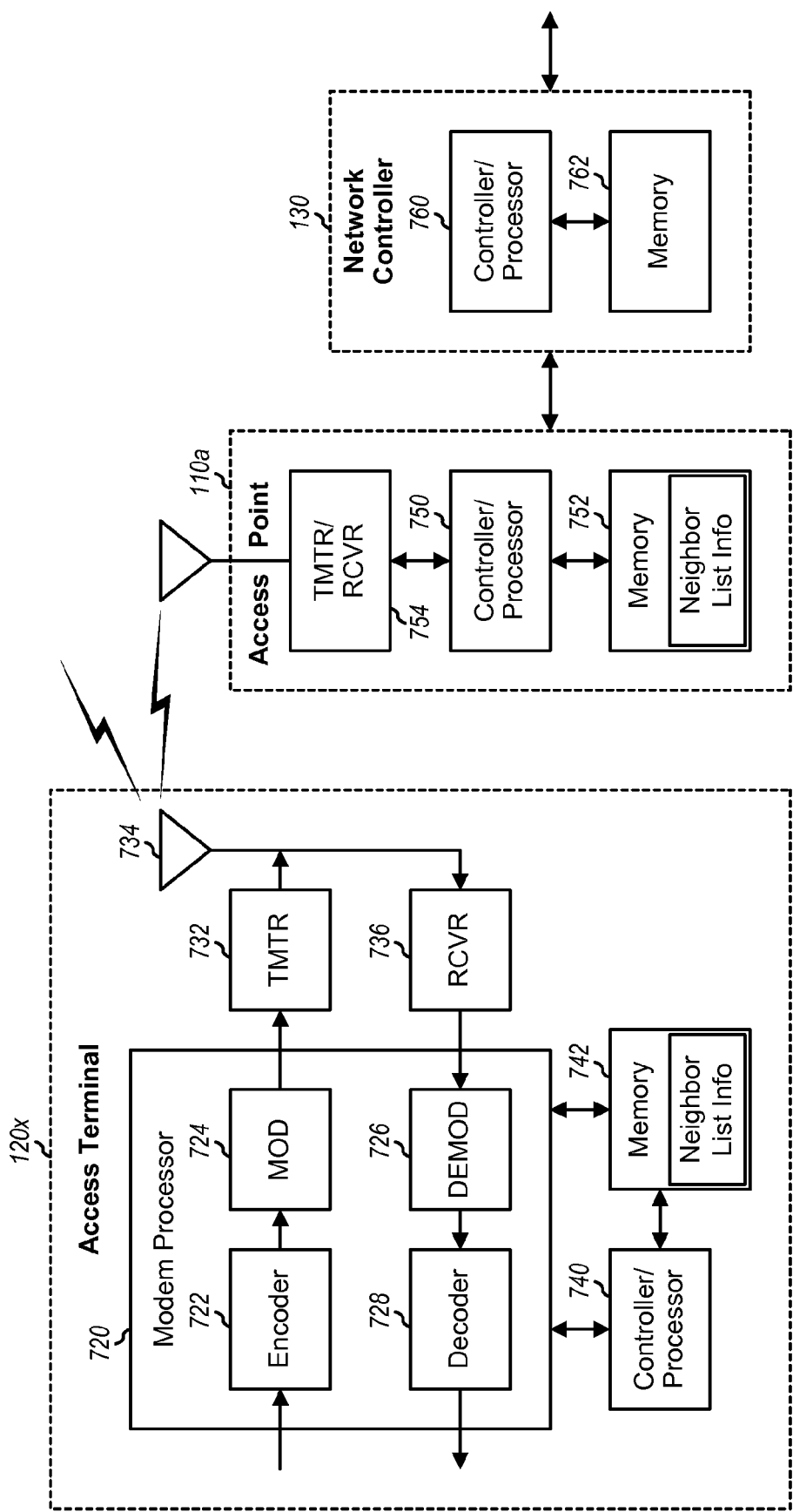
FIG. 7 shows a block diagram of an access terminal and an access point.

FIG. 7 shows a block diagram of a design of access terminal 120*x*, access point 110*a*, and network controller 130. On the reverse link, data and signaling to be sent by access terminal 120*x* may be processed (e.g., formatted, encoded, and interleaved) by an encoder 722 and further processed (e.g., modulated, channelized, and spread) by a modulator (MOD) 724 to generate output chips. A transmitter (TMTR) 732 may condition (e.g., convert to analog, filter, amplify, and frequency upconvert) the output chips and generate a reverse link signal, which may be transmitted via an antenna 734. On the forward link, antenna 734 may receive forward link signals transmitted by access point 110*a* and other access points. A receiver (RCVR) 736 may condition (e.g., filter, amplify, frequency downconvert, and digitize) a received signal from antenna 734 and provide samples. A demodulator (DEMOD) 726 may process (e.g., despread, channelize, and demodulate) the samples and provide symbol estimates. A decoder 728 may further process (e.g., deinterleave and decode) the symbol estimates and provide decoded data. Encoder 722, modulator 724, demodulator 726, and decoder 728 may be implemented by a modem processor 720. These units may perform processing in accordance with the radio technology (e.g., HRPD, CDMA 1X, W-CDMA, GSM, etc.) utilized by the wireless network with which access terminal 120*x* communicates.

A controller/processor 740 may direct the operation at access terminal 120*x*. Controller/processor 740 may perform process 500 in FIG. 5 and/or other processes for the techniques described herein. A memory 742 may store program codes and data for access terminal 120*x*. Memory 742 may also store neighbor list information from an acquired sector prior to performing inter-frequency handoff to another sector.

FIG. 7 also shows a design of access point 110*a* and network controller 130. Access point 110*a* includes a controller/processor 750 that performs various functions for communication with the access terminals, a memory 752 that stores program codes and data for access point 110*a*, and a transmitter/receiver 754 that supports radio communication with the access terminals. Controller/processor 750 may perform process 600 in FIG. 6 and/or other processes for the techniques described herein. Controller/processor 750 may determine neighbor list information for each of the sectors served by access point 110*a*. These sectors may operate on different frequencies. For each sector, controller/processor 750 may generate an overhead message containing the neighbor list information for that sector and may broadcast the message to access terminals within the coverage of the sector. Memory 752 may store the neighbor list information for each sector served by access point 110*a*.

Network controller 130 includes a controller/processor 760 that performs various functions to support communication for the access terminals and a memory 762 that stores program codes and data for network controller 130. Controller/processor 760 may determine and provide neighbor list information for different sectors to access point 110*a*.

The techniques described herein may be implemented by various means. For example, these techniques may be implemented in hardware, firmware, software, or a combination thereof. For a hardware implementation, the processing units used to perform the techniques at an entity (e.g., an access terminal, an access point, or a network controller) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 742, 752 or 762 in FIG. 7) and executed by a processor (e.g., processor 740, 750 or 760). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An access terminal, comprising:
at least one processor configured to acquire a first sector on a first frequency in a wireless communication network, to receive an overhead message from the first sector, to obtain neighbor list information from the overhead message that includes information related to a second sector on a second frequency, to perform handoff to the second sector on the second frequency, the first and second sectors being geographically co-located sectors that are each operated by a given access point that is configured to serve access terminals within a single cell of the wireless communication network via direct wireless communication between the given access point and the served access terminals, the overhead message being a periodically broadcasted overhead message that is configured to convey sector information to the served access terminals, to determine a neighbor sector based on the neighbor list information if the handoff to the second sector is unsuccessful, and to attempt acquisition of the neighbor sector if determined; and
a memory coupled to the at least one processor.

2. The access terminal of claim 1, wherein the at least one processor is configured to determine from the overhead message a set of frequencies comprising the first and second frequencies, to select the second frequency based on a hash function, and to perform handoff to the second sector on the second frequency based on result of the hash function.

3. The access terminal of claim 1, wherein the memory is configured to store the neighbor list information prior to the handoff to the second sector.

4. The access terminal of claim 1, wherein if the handoff to the second sector is unsuccessful, the at least one processor is configured to determine a list of neighbor sectors based on the neighbor list information, and to select the neighbor sector from the list of neighbor sectors.

5. The access terminal of claim 1, wherein if the handoff to the second sector is unsuccessful, the at least one processor is configured to determine a list of neighbor sectors operating on the second frequency based on the neighbor list information, and to select the neighbor sector from the list of neighbor sectors.

6. The access terminal of claim 1, wherein the at least one processor is configured to acquire the neighbor sector on the second frequency and to perform handoff to the neighbor sector.

7. The access terminal of claim 1, wherein the at least one processor is configured to search for sectors in the wireless communication network at power up, to detect the first sector during the search at power up, and to acquire the first sector to access the wireless communication network.

8. The access terminal of claim 1, wherein the at least one processor is configured to perform an inter-frequency search for neighbor sectors while communicating with the first sector, to detect the second sector during the inter-frequency search, and to perform handoff from the first sector to the second sector.

9. The access terminal of claim 1, wherein if the handoff to the second sector is successful, the at least one processor is configured to receive a second overhead message from the second sector, and to search for neighbor sectors indicated by the second overhead message.

10. The access terminal of claim 1, wherein the wireless communication network is a High Rate Packet Data (HRPD) network, and wherein the overhead message is a SectorParameters message.

11. A method performed at an access terminal for accessing a wireless communication network, comprising:
acquiring a first sector on a first frequency in the wireless communication network;
receiving an overhead message from the first sector;
obtaining neighbor list information from the overhead message that includes information related to a second sector on a second frequency;
performing handoff to the second sector on the second frequency, the first and second sectors being geographically co-located sectors that are operated by a given access point that is configured to serve access terminals within a single cell of the wireless communication network via direct wireless communication between the given access point and the served access terminals, the overhead message being a periodically broadcasted overhead message that is configured to convey sector information to the served access terminals;
determining a neighbor sector based on the neighbor list information if the handoff to the second sector is unsuccessful; and
attempting acquisition of the neighbor sector if determined.

12. The method of claim 11, wherein the performing handoff to the second sector comprises
determining from the overhead message a set of frequencies comprising the first and second frequencies,
selecting the second frequency based on a hash function, and
performing handoff to the second sector on the second frequency based on result of the hash function.

13. The method of claim 11, wherein the determining the neighbor sector comprises
determining a list of neighbor sectors operating on the second frequency based on the neighbor list information, and
selecting the neighbor sector from the list of neighbor sectors.

14. The method of claim 11, further comprising:
acquiring the neighbor sector on the second frequency; and
performing handoff to the neighbor sector.

15. The method of claim 11, wherein the performing handoff to the second sector comprises
determining from the overhead message a set of frequencies comprising the first and second frequencies, and
performing handoff to the second sector on the second frequency based on the set of frequencies from the overhead message.

16. The method of claim 11, wherein the overhead message conveys the information related to the second sector on the second frequency without express instructions for the access terminal to perform the handoff to the second sector on the second frequency.

17. An access terminal, comprising:
means for acquiring a first sector on a first frequency in a wireless communication network;
means for receiving an overhead message from the first sector;
means for obtaining neighbor list information from the overhead message that includes information related to a second sector on a second frequency;
means for performing handoff to the second sector on the second frequency, the first and second sectors being geographically co-located sectors that are each operated by a given access point that is configured to serve access terminals within a single cell of the wireless communication network via direct wireless communication between the given access point and the served access terminals, the overhead message being a periodically broadcasted overhead message that is configured to convey sector information to the served access terminals;

means for determining a neighbor sector based on the neighbor list information if the handoff to the second sector is unsuccessful; and means for attempting acquisition of the neighbor sector if determined.

18. The access terminal of claim 17, wherein the means for performing handoff to the second sector comprises means for determining from the overhead message a set of frequencies comprising the first and second frequencies, means for selecting the second frequency based on a hash function, and means for performing handoff to the second sector on the second frequency based on result of the hash function.

19. The access terminal of claim 17, wherein the means for determining the neighbor sector comprises means for determining a list of neighbor sectors operating on the second frequency based on the neighbor list information, and means for selecting the neighbor sector from the list of neighbor sectors.

20. The access terminal of claim 17, further comprising:

means for acquiring the neighbor sector on the second frequency; and means for performing handoff to the neighbor sector.

21. A non-transitory processor-readable media for storing instructions to cause an access terminal to:

acquire a first sector on a first frequency in a wireless communication network;

receive an overhead message from the first sector;

obtain neighbor list information from the overhead message that includes information related to a second sector on a second frequency;

perform handoff to the second sector on the second frequency, the first and second sectors being geographically co-located sectors that are each operated by a given access point that is configured to serve access terminals within a single cell of the wireless communication network via direct wireless communication between the given access point and the served access terminals, the overhead message being a periodically broadcasted overhead message that is configured to convey sector information to the served access terminals;

determine a neighbor sector based on the neighbor list information if the handoff to the second sector is unsuccessful; and attempt acquisition of the neighbor sector if determined.

22. The processor-readable media of claim 21, and further for storing instructions to:

determine from the overhead message a set of frequencies comprising the first and second frequencies;

select the second frequency based on a hash function; and perform handoff to the second sector on the second frequency based on result of the hash function.

23. The processor-readable media of claim 21, and further for storing instructions to:

determine a list of neighbor sectors operating on the second frequency based on the neighbor list information; and select the neighbor sector from the list of neighbor sectors.

24. The processor-readable media of claim 21, and further for storing instructions to:

acquire the neighbor sector on the second frequency; and perform handoff to the neighbor sector.

25. An access point comprising:

at least one processor configured to determine neighbor list information for a first sector operating on a first frequency in a wireless communication network, to generate an overhead message comprising the neighbor list information, and to periodically broadcast the overhead message from the first sector, the neighbor list information comprising information related to a second sector operating on a second frequency different from the first frequency, the first and second sectors being geographically co-located sectors that are each operated by the access point that is configured to serve access terminals within a single cell of the wireless communication network via direct wireless communication between the access point and the served access terminals, each periodically broadcasted overhead message configured to convey sector information to the served access terminals; and a memory coupled to the at least one processor.

26. The access point of claim 25, wherein the at least one processor is configured to obtain a neighbor list for the second sector operating on the second frequency, and to determine the at least one neighbor sector in the neighbor list information based on the neighbor list for the second sector.

27. The access point of claim 25, wherein the wireless communication network is a High Rate Packet Data (HRPD) network, and wherein the overhead message is a SectorParameters message.

28. A method of operating an access point, comprising:

determining neighbor list information for a first sector operating on a first frequency in a wireless communication network, the neighbor list information comprising information related to a second sector operating on a second frequency different from the first frequency, the first and second sectors being geographically co-located sectors with a total coverage area of the first sector being substantially overlapped by a coverage area of the second sector, the first and second sectors each operated by the access point that is configured to serve access terminals within a single cell of the wireless communication network via direct wireless communication between the access point and the served access terminals;

generating an overhead message comprising the neighbor list information; and periodically broadcasting the overhead message from the first sector to convey sector information to the served access terminals.

29. The method of claim 28, wherein the determining the neighbor list information for the first sector comprises obtaining a neighbor list for the second sector operating on the second frequency, and determining the at least one neighbor sector in the neighbor list information based on the neighbor list for the second sector.

30. The method of claim 28, wherein a total coverage area of the first sector is substantially overlapped by a coverage area of the second sector.

31. The method of claim 30, wherein the first sector covers an interior coverage area of the access point, and wherein the second sector covers both the interior coverage area and an exterior coverage area of the access point.

32. An access point comprising:

means for determining neighbor list information for a first sector operating on a first frequency in a wireless communication network, the neighbor list information comprising information related to a second sector operating on a second frequency different from the first frequency, the first and second sectors being geographically co-located sectors with a total coverage area of the first sector being substantially overlapped by a coverage area of the second sector, the first and second sectors each operated by the access point that is configured to serve access terminals within a single cell of the wireless communication network via direct wireless communication between the access point and the served access terminals;

means for generating an overhead message comprising the neighbor list information; and means for periodically broadcasting the overhead message from the first sector to convey sector information to the served access terminals.

33. The access point of claim 32, wherein the means for determining the neighbor list information for the first sector comprises means for obtaining a neighbor list for the second sector operating on the second frequency, and means for determining the at least one neighbor sector in the neighbor list information based on the neighbor list for the second sector.

34. The method of claim 11, wherein the first and second sectors correspond to geographically co-located coverage areas of the same base station of the wireless communications network.

35. The method of claim 11, wherein the neighbor list information includes information for at least one neighbor sector operating on a different frequency from the first frequency.

36. The method of claim 11, wherein the first and second sectors are not neighbor sectors of each other.

37. A non-transitory processor-readable media for storing instructions to cause an access point to:

determine neighbor list information for a first sector operating on a first frequency in a wireless communication network, the neighbor list information comprising information related to a second sector operating on a second frequency different from the first frequency, the first and second sectors being geographically co-located sectors that are each operated by the access point that is configured to serve access terminals within a single cell of the wireless communication network via direct wireless communication between the access point and the served access terminals;

generate an overhead message comprising the neighbor list information; and periodically broadcast the overhead message from the first sector to convey sector information to the served access terminals.

* * * * *